(12) United States Patent
Seo et al.

(10) Patent No.: US 8,499,314 B2
(45) Date of Patent: Jul. 30, 2013

(54) DISC LOADING DEVICE TO LOAD DIFFERENT SIZE DISCS

(75) Inventors: Jae Kab Seo, Suwon-si (KR); Won Youl Bae, Gwacheon-si (KR); Heyun Moon Bang, Suweon-si (KR); Byeng Bae Park, Ansan-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 797 days.

(21) Appl. No.: 12/632,983

(22) Filed: Dec. 8, 2009

(65) Prior Publication Data
US 2010/0169902 A1  Jul. 1, 2010

(30) Foreign Application Priority Data
Dec. 29, 2008 (KR) .................... 10-2008-0135456

(51) Int. Cl.
  *G11B 17/04* (2006.01)
(52) U.S. Cl.
  USPC ........................................... 720/623
(58) Field of Classification Search
  USPC ...................... 720/622, 623, 626
  See application file for complete search history.

(56) References Cited

U.S. PATENT DOCUMENTS

| 5,022,023 | A | * | 6/1991 | Toyoguchi | ............... 720/624 |
| 5,097,460 | A | * | 3/1992 | Camps et al. | ............ 720/621 |
| 2003/0227856 | A1 | | 12/2003 | Kim et al. | |

FOREIGN PATENT DOCUMENTS

| EP | 1 830 356 | 9/2007 |
| JP | 2007-073162 | 3/2007 |

OTHER PUBLICATIONS

European Search Report issued in European Patent Application No. 09178718.4 on Aug. 12, 2011.

* cited by examiner

*Primary Examiner* — David D Davis
(74) *Attorney, Agent, or Firm* — Stanzione & Kim, LLP

(57) ABSTRACT

Disclosed herein is a disc loading device applied to small-sized and slim type disc players. The disc loading device may include a first guide lever, a second guide lever, a trigger lever, a chucking unit, a slider, and a connecting unit. The connecting unit may be selectively operatively connected to the second guide lever, upon loading a first disc or a second disc, to change a timing at which a rotational force of the trigger lever may be transmitted to the slider.

15 Claims, 13 Drawing Sheets

DISC LOADING DEVICE TO LOAD DIFFERENT SIZE DISCS

CROSS-REFERENCE TO RELATED APPLICATIONS

This application claims priority from 35 U.S.C. §119 Korean Patent Application No. 2008-0135456, filed on Dec. 29, 2008 in the Korean Intellectual Property Office, the disclosure of which is incorporated herein by reference.

BACKGROUND

1. Field of the Invention

Embodiments of the present general inventive concept relate to a disc loading device wherein a disc is directly inserted without a tray to load the disc.

2. Description of the Related Art

A disc player irradiates light to a disc, such as a compact disc (CD), a digital versatile disc (DVD), or a Blue-ray disc (BD), to record information to the disc or reproduce information from the disc. Generally, the disc player includes a disc loading device to load the disc to a position to record/reproduce information to/from the disc.

For a disc player for vehicles or mobile applications, a disc is directly inserted and loaded without a tray to load the disc due to spatial limitations. Also, a disc loading device to distinguish and load discs having different sizes is applied to use, for example, an 80 mm disc and a 120 mm disc together.

To distinguish and load discs having different sizes, the disc loading device includes mechanism components mounted above the discs to recognize the sizes of discs. That is, the disc loading device includes a plurality of guide levers, a slider, and a connector mounted above the discs to distinguish and load an 80 mm disc and a 120 mm disc. The disc loading device may not be applied to small-sized and slim type disc players. Therefore, there is a high necessity to develop a disc loading device having small thickness.

SUMMARY

Therefore, it is a feature of the present general inventive concept to provide a small-sized and slim type disc loading device wherein mechanism components constituting a loading mechanism may be located outside a disc.

Additional features and utilities of the present general inventive concept will be set forth in part in the description which follows and, in part, will be obvious from the description, or may be learned by practice of the general inventive concept.

In accordance with one feature of the present general inventive concept, a disc loading device may include a main frame and a sub frame defining a loading region to allow a first disc and a second disc having different diameters to be loaded thereto, a first guide lever rotatably mounted outside the loading region and extending into the loading region to interfere with the discs, a second guide lever rotatably mounted outside the loading region and extending into the loading region to interfere with the discs, a trigger lever rotatably mounted outside the loading region and extending into the loading region to interfere with the discs, a chucking unit to chuck the first disc or the second disc located at the loading region, a slider reciprocatably mounted outside the loading region to operate the chucking unit, and a connecting unit disposed between the trigger lever and the slider to transmit a rotational force of the trigger lever to the slider. The connecting unit may be selectively operatively connected to the second guide lever, upon loading the first disc or the second disc, to change a timing at which the rotational force of the trigger lever is transmitted to the slider.

The connecting unit may include a connecting cam rotatably mounted to be operatively connected to the second guide lever and a connecting rod translatably and rotatably mounted to be operatively connected to the connecting cam and the trigger lever.

The connecting cam may have a third connection groove to be operatively connected to the connecting rod, and the connecting rod may have a third connection protrusion inserted in the third connection groove.

The connecting cam may have a fourth connection groove to be operatively connected to the second guide lever, and the second guide lever may have a fourth connection protrusion inserted in the fourth connection groove.

The connecting rod may have a first constraint part and a second constraint part to be operatively connected to the trigger lever, and the trigger lever may have an output protrusion to be selectively constrained by the first constraint part and the second constraint part.

The output protrusion may be constrained by the first constraint part when the connecting cam is not operatively connected to the second guide lever, and the output protrusion may be constrained by the second constraint part when the connecting cam is operatively connected to the second guide lever.

The disc loading device may further include a gap adjustment plate to be operatively connected to the slider with a movement of the slider.

The slider may have a third catching protrusion to be operatively connected to the gap adjustment plate, and the gap adjustment plate may have a fourth catching protrusion to be coupled to the third catching protrusion.

The gap adjustment plate may have a second gap adjustment protrusion to push the trigger lever.

The disc loading device may further include a connection plate selectively operatively connected to the gap adjustment plate to cause rotation of the first guide lever and the second guide lever to separate the first guide lever and the second guide lever from the second disc.

The gap adjustment plate may have a first gap adjustment protrusion, and the connection plate may have a pass-through part to allow the first gap adjustment protrusion to pass therethrough when loading the first disc and a contact part to interfere with the first gap adjustment protrusion when loading the second disc.

The connection plate may be operatively connected to the first guide lever, and the second guide lever may be operatively connected to the first guide lever.

The connection plate may have a first connection protrusion to be operatively connected to the first guide lever, and the first guide lever may have a first connection groove to receive the first connection protrusion.

The first guide lever may have a first catching protrusion to be operatively connected to the second guide lever, and the second guide lever may have a second catching protrusion supported by the first catching protrusion.

The connecting rod may have an auxiliary protrusion member to provide an elastic force to rotate the connecting rod in one direction.

In accordance with another exemplary embodiment of the present general inventive concept, a disc loading device may include a main frame and a sub frame defining a loading region to allow a first disc and a second disc having different diameters to be loaded thereto, a plurality of first guide levers linked to each other and rotatably mounted outside the loading region and extending into the loading region, and a plurality of second guide levers linked to each other and rotatably mounted outside the loading region and extending into the loading region, the second guide levers constraining or releasing the first guide levers. The second guide levers may constrain the first guide levers upon loading the first disc to the loading region such that a chucking position of the first disc is decided by the first guide levers, and the second guide levers may release the first guide levers upon loading the second disc to the loading region such that a chucking position of the second disc is decided by the first guide levers and the second guide levers moving out of the loading region.

Embodiments of the present general inventive concept also provide a disc loading device, comprising a lower frame and a upper frame defining a disc placement region to allow discs of different sizes to be placed thereon, a narrow pair of pivoting levers facing each other to guide discs into the disc placement region, and a wide pair of pivoting levers facing each other to guide discs into the disc placement region, wherein a first elastic member mounted in the upper frame to opposite forces to the narrow pair of pivoting levers, and a second elastic member mounted on one of the wide pair of pivoting levers to provide a rotating force to one of the wide pair of pivoting levers.

Embodiments of the present general inventive concept also provide a disc loading device, comprising a first frame and a second frame to define a loading region, a trigger lever having an end disposed to contact a first disc in a first loading region of the loading region, a plurality of levers each having an end disposed to contact a second disc in a second loading region of the loading region, a clockwise rotation of a second right-side lever is limited due to a first catching protrusion on a first right-side lever upon uploading a second disc into the loading region, and a counterclockwise rotation of a first right-side lever is limited due to a stopper on the second right-side lever upon loading a first disc into the loading region.

Embodiments of the present general inventive concept also provide a disc drive apparatus, comprising a controller to control the loading and unloading of small and large sized discs into the disc driving apparatus, wherein the controller further controls a loading and unloading unit to advance small and large discs into the disc drive apparatus toward a loading region, a chucking unit to chuck small and large discs located in the loading region, a detecting unit to sense placement of small and large discs within the disc drive apparatus, a trigger lever rotatably mounted outside the loading region and extending into the loading region, a first guide lever rotatably mounted outside the loading region and extending into the loading region to guide small and large discs into the loading region; and a second guide lever rotatably mounted outside the loading region and extending into the loading region to guide large discs into the loading region.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
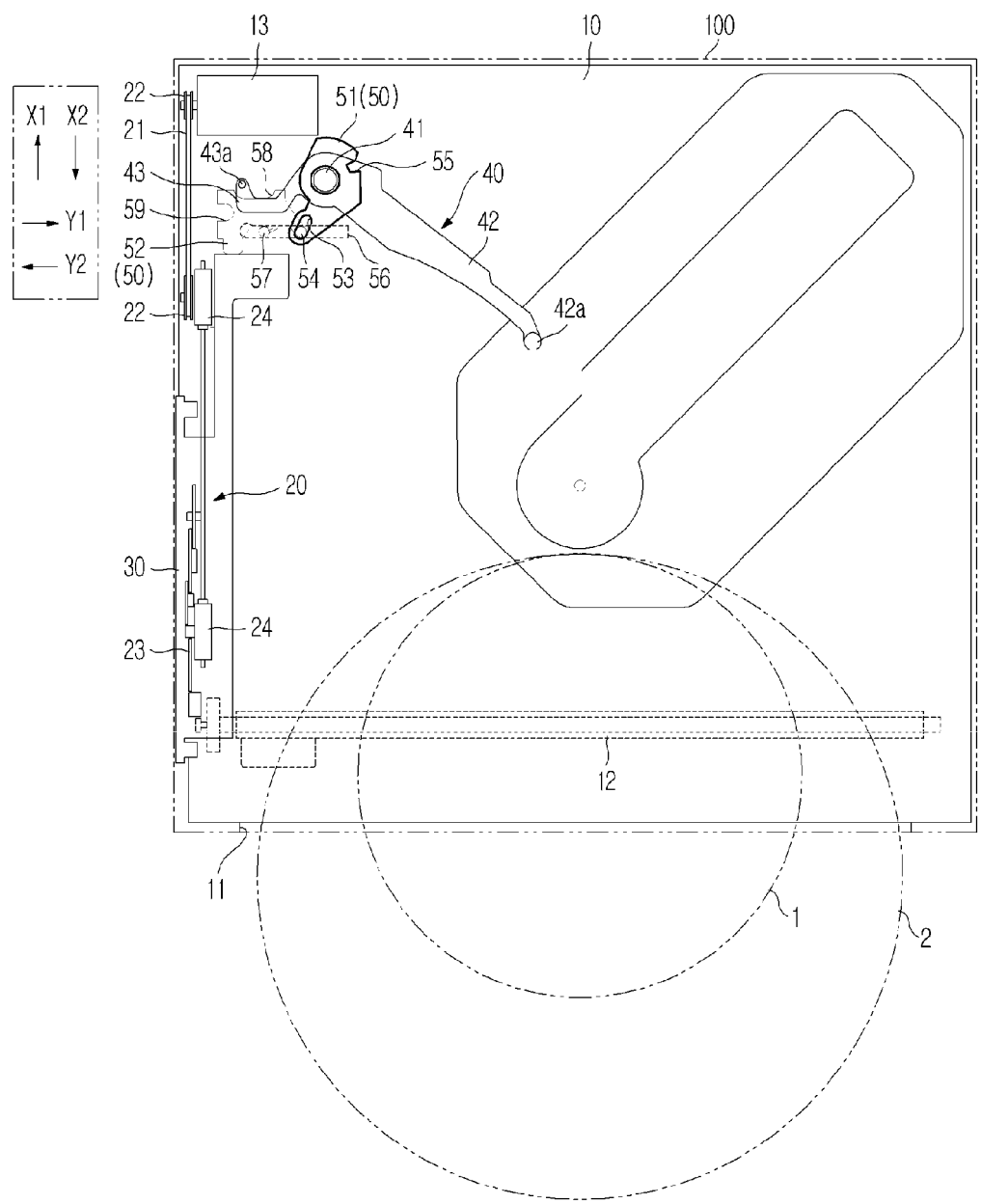
FIG. 1 is a plan view schematically illustrating the structure of a loading mechanism mounted in a main frame according to an exemplary embodiment of the present general inventive concept.

Reference will now be made in detail to the embodiments of the present general inventive concept, examples of which are illustrated in the accompanying drawings, wherein like reference numerals refer to the like elements throughout.

Figure 2:
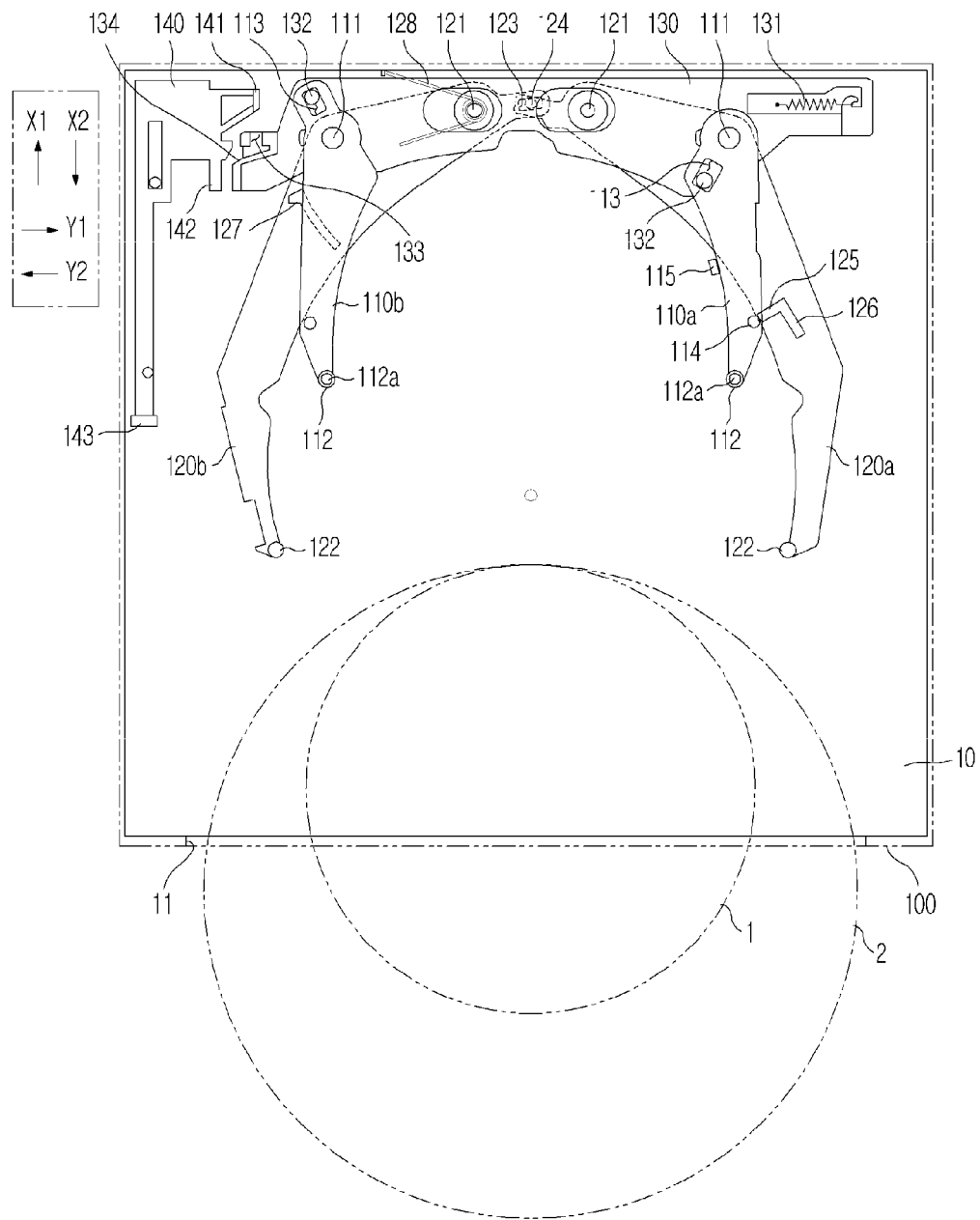
FIG. 2 is a plan view schematically illustrating the structure of a loading mechanism mounted in a sub frame according to another exemplary embodiment of the present general inventive concept.
Figure 3:
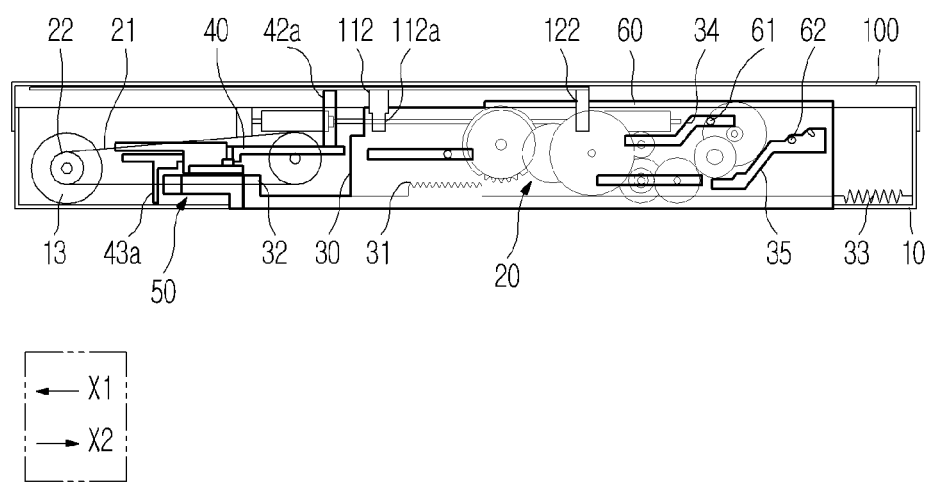
FIGS. 3 and 4 are side views schematically illustrating a disc loading device according to an exemplary embodiment of the present general inventive concept.
Figure 4:
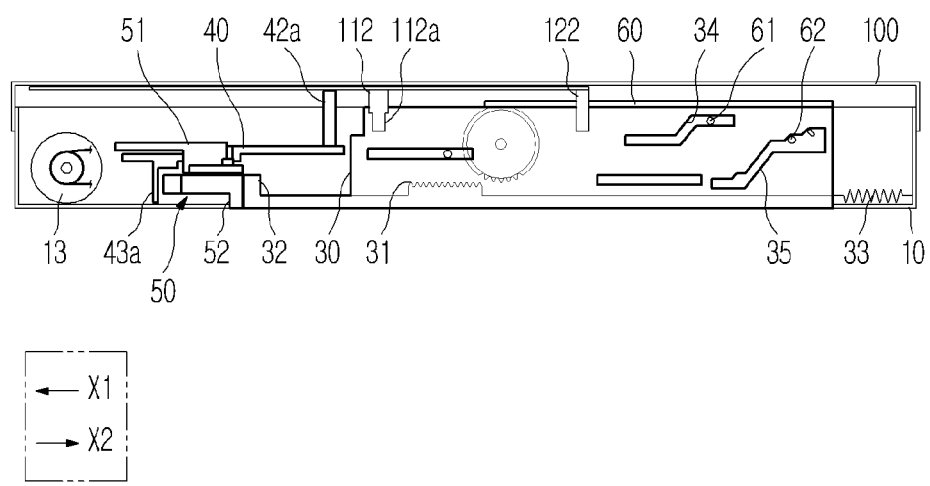
Figure 5:
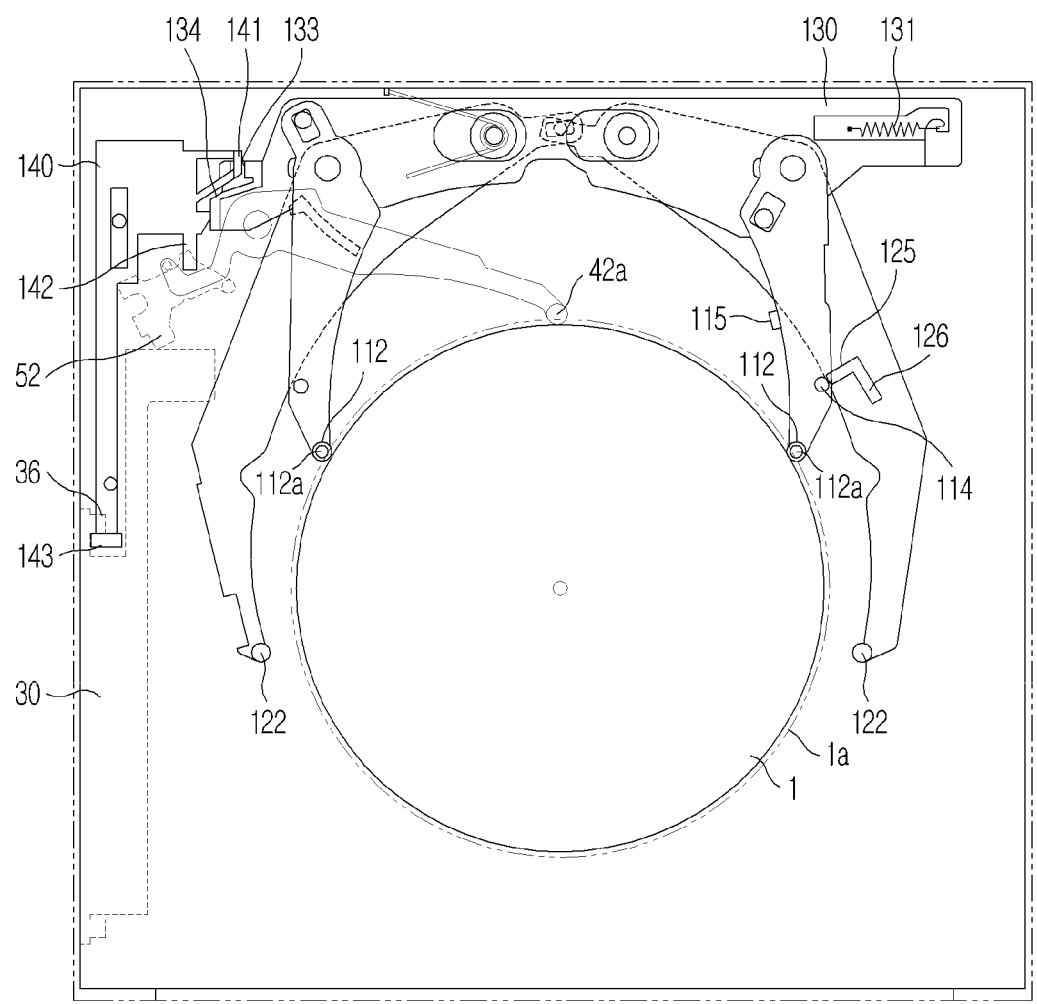
FIGS. 5 to 8 are views illustrating the loading of a first disc according to an exemplary embodiment of the present general inventive concept.

FIG. 1 is a plan view schematically illustrating the structure of a loading mechanism mounted in a main frame according to an exemplary embodiment of the present general inventive concept, FIG. 2 is a plan view schematically illustrating the structure of a loading mechanism mounted in a sub frame according to another exemplary embodiment of the present general inventive concept, and FIGS. 3 and 4 are side views schematically illustrating a disc loading device according to an exemplary embodiment of the present general inventive concept. Hereinafter, a disc loading/unloading direction will be referred to as an X direction, and a direction perpendicular to the X direction will be referred to as a Y direction, for easy understanding. The X direction may include an X1 direction in which a disc is loaded and an X2 direction opposite to the X1 direction. The Y direction may include a Y1 direction and a Y2 direction opposite to the Y1 direction.

As illustrated in FIGS. 1 to 4, the disc loading device may include a main frame 10 and a sub frame 100 coupled to the main frame 10 to define a space. In the space defined between the main frame 10 and the sub frame 100 may be mounted various components constituting a loading mechanism to load a disc.

The loading mechanism distinguishes and loads a first disc 1 and a second disc 2 which have different diameters. The first disc 1 may have a small diameter (for example, about 80 mm). The second disc 2 may have a large diameter (for example, about 120 mm). The first disc 1 and the second disc 2 may be simply referred to as a disc.

At the main frame 10 are mounted a loading motor 13 to advance a disc inside, a transfer roller 12, and a gear unit 20. Adjacent to a disc insertion hole 11 is mounted a switch or an optical sensor to sense the disc.

The loading motor 13 receives an electric signal to drive a disc when the disc is sensed by the switch or the optical sensor.

The transfer roller 12 transfers a disc using friction between the transfer roller and the disc. The outside of the transfer roller 12 may be formed of a rubber material having frictional force. The transfer roller 12 may be rotatably supported adjacent to the disc insertion hole 11.

The gear unit 20 transmits power from the loading motor 13 to the transfer roller 12. The gear unit 20 may connect to the loading motor 13 via a belt 21 and a pulley 22 and to the transfer roller 12 via a relay gear group 23. In addition, the gear unit 20 transmits power and adjusts reduction gear ratio using a worm gear 24 and the relay gear group 23. One of the relay gear group 23 engages with a rack 31 of a slider 30 to move the slider 30, which will be described later.

The loading motor 13, the transfer roller 12, and the gear unit 20 are mounted at the main frame 10 to advance a disc into the disc loading device. The disc is guided to a chucking position in the disc loading device by a disc guide mechanism mounted at the sub frame 100.

At the sub frame 100 are mounted a plurality of first guide levers 110*a* and 110*b* to guide a first disc 1 to a first loading region 1*a* and a plurality of second guide levers 120*a* and 120*b* to guide a second disc 2 to a second loading region 2*a*.

The first guide levers 110*a* and 110*b* are rotatably mounted at the sub frame 100 outside the second loading region 2*a*. The first guide levers 110*a* and 110*b* may have an end to extend into the second loading region 2*a*. That is, each of the first guide levers 110*a* and 110*b* has a first rotary shaft 111 provided at one end thereof, the first rotary shaft 111 being located outside the second loading region 2*a*, and a first guide protrusion 112 provided at the other end thereof, the first guide protrusion 112 may be located adjacent to a boundary line between the first loading region 1*a* and the second loading region 2*a*. The first guide levers 110*a* and 110*b* may interfere with a first disc 1 or a second disc 2 when the first disc 1 or the second disc 2 is loaded into the disc loading device.

The first guide levers 110*a* and 110*b* are linked to each other, and therefore, the first guide levers 110*a* and 110*b* are rotated together. The first guide levers 110*a* and 110*b* are coupled to each other by a connection plate 130. First connection protrusions 132 of the connection plate 130 are inserted in first connection grooves 113 of the first guide levers 110*a* and 110*b*. The first connection groove 113 of the right-side first guide lever 110*a* and the first connection groove 113 of the left-side first guide lever 110*b* are located in opposite directions. The first connection protrusions 132 corresponding to the first connection grooves 113 may be also located in opposite directions.

The connection plate 130 is mounted at the sub frame 100 to reciprocate in the Y direction. The connection plate 130 is elastically supported by a first spring 131 in the Y2 direction. Consequently, a force rotating counterclockwise about the first rotary shaft 111 is applied to the left-side first guide lever 110*b*, and a force rotating clockwise about the first rotary shaft 111 is applied to the right-side first guide lever 110*a*. However, a first stopper 115 to limit the rotation of the right-side first guide lever 110*a* may be mounted at the sub frame 100 such that the first guide protrusion 112 of the left-side first guide lever 110*b* and the first guide protrusion 112 of the right-side first guide lever 110*a* do not advance to the first loading region 1*a*. The rotation of the left-side first guide lever 110*b* linked to the right-side first guide lever 110*a* may also be limited by the first stopper 115.

At one side of the connection plate 130 is provided a gap adjustment plate 140 which is mounted at the sub frame 100 to reciprocate in the X direction. The gap adjustment plate 140 is operatively connected to the slider 30, a trigger lever 40, and the connection plate 130, which will be described later.

The second guide levers 120*a* and 120*b* are rotatably mounted at the sub frame 100 outside the second loading region 2*a*. The second guide levers 120*a* and 120*b* extend into the second loading region 2*a*. That is, each of the second guide levers 120*a* and 120*b* has a second rotary shaft 121 provided at one end thereof, the second rotary shaft 121 being located outside the second loading region 2*a*, and a second guide protrusion 122 provided at the other end thereof, the second guide protrusion 122 being located in the second loading region 2*a*. At the second rotary shaft 121 of the left-side second guide lever 120*b* is mounted a second spring 128 to provide a force to rotate the left-side second guide lever 120*b* in the counterclockwise direction and to provide a force to rotate the right-side second guide lever 120*a* in the clockwise direction. The rotation of the right-side second guide lever 120*a* may be limited because a second stopper 125 of the right-side second guide lever 120*a* may be caught by a first catching protrusion 114 of the right-side first guide lever 110*a*. The second guide levers 120*a* and 120*b* may interfere with a second disc 2 when the second disc 2 is loaded into the disc loading device.

The second guide levers 120*a* and 120*b* are linked to each other, and therefore, the second guide levers 120*a* and 120*b* are rotated together. A second connection protrusion 124 of the right-side second guide lever 120*a* is inserted in a second connection groove 123 of the left-side second guide lever 120*b*. Consequently, when the right-side second guide lever 120*a* is rotated in the clockwise direction, the left-side second guide lever 120*b* is rotated in the counterclockwise direction.

Meanwhile, the first catching protrusion 114 may be formed at the right-side first guide lever 110*a*, and the second stopper 125 and a second catching protrusion 126 may be formed at the right-side second guide lever 120*a*. When the first catching protrusion 114 is constrained by the second stopper 125, the counterclockwise rotation of the right-side first guide lever 110*a* may be limited. When the first catching protrusion 114 is released from the second stopper 125, the counterclockwise rotation of the right-side first guide lever 110*a* may be allowed. In this way, the first guide levers 110*a* and 110*b* may be constrained by or released from the second guide levers 120*a* and 120*b*, which will be described in detail later.

At the main frame 10 are mounted a trigger lever 40 and a connecting unit 50 to move the slider 30 by a predetermined distance in the X2 direction when a disc is inserted.

The trigger lever 40 is rotatably mounted outside the second loading region 2*a*. The trigger lever 40 includes a third rotary shaft 41 and an input arm 42 and an output arm 43 extending from the third rotary shaft 41. The third rotary shaft 41 and the output arm 43 are located outside the second loading region 2*a*. The input arm 42 is located inside the second loading region 2*a*. The input arm 42 may have an input protrusion 42*a* to interfere with a first disc 1 or a second disc 2. The output arm 43 may have an output protrusion 43*a* constrained by the connecting unit 50.

The connecting unit 50 includes a connecting cam 51 mounted to the third rotary shaft 41 to rotate along with the third rotary shaft 41 and a connecting rod 52 mounted between the output arm 43 of the trigger lever 40 and a support part 32 of the slider 30 to perform translation and reciprocation. The connecting cam 51 may be linked to the connecting rod 52. A third connection protrusion 54 of the connecting rod 52 may be inserted in a third connection groove 53 of the connecting cam 51.

The connecting rod 52 is supported at the main frame 10 to perform translation and reciprocation. The third connection protrusion 54 of the connecting rod 52 is inserted in a connection groove 56 of the main frame 10. Also, the connecting rod 52 may have an auxiliary protrusion member 57. The auxiliary protrusion member 57 may be inserted in the connection groove 56, while being elastically deformed, to provide a force to rotate the connecting rod 52 in the counterclockwise direction. Since the auxiliary protrusion member 57 may be elastically deformed, the connecting rod 52 may rotate clockwise about the third connection protrusion 54 when the trigger lever 40 pushes the connecting rod 52 in the clockwise direction. Furthermore, the third connection protrusion 54 and the auxiliary protrusion member 57 may be inserted in the elongated connection groove 56 to translate in the Y direction.

The connecting rod 52 has a first constraint part 58 and a second constraint part 59 to selectively constrain the output protrusion 43*a* of the trigger lever 40. With translation of the connecting rod 52, the output protrusion 43*a* is selectively constrained by the first constraint part 58 and the second constraint part 59, which will be described in detail later.

Figure 6:
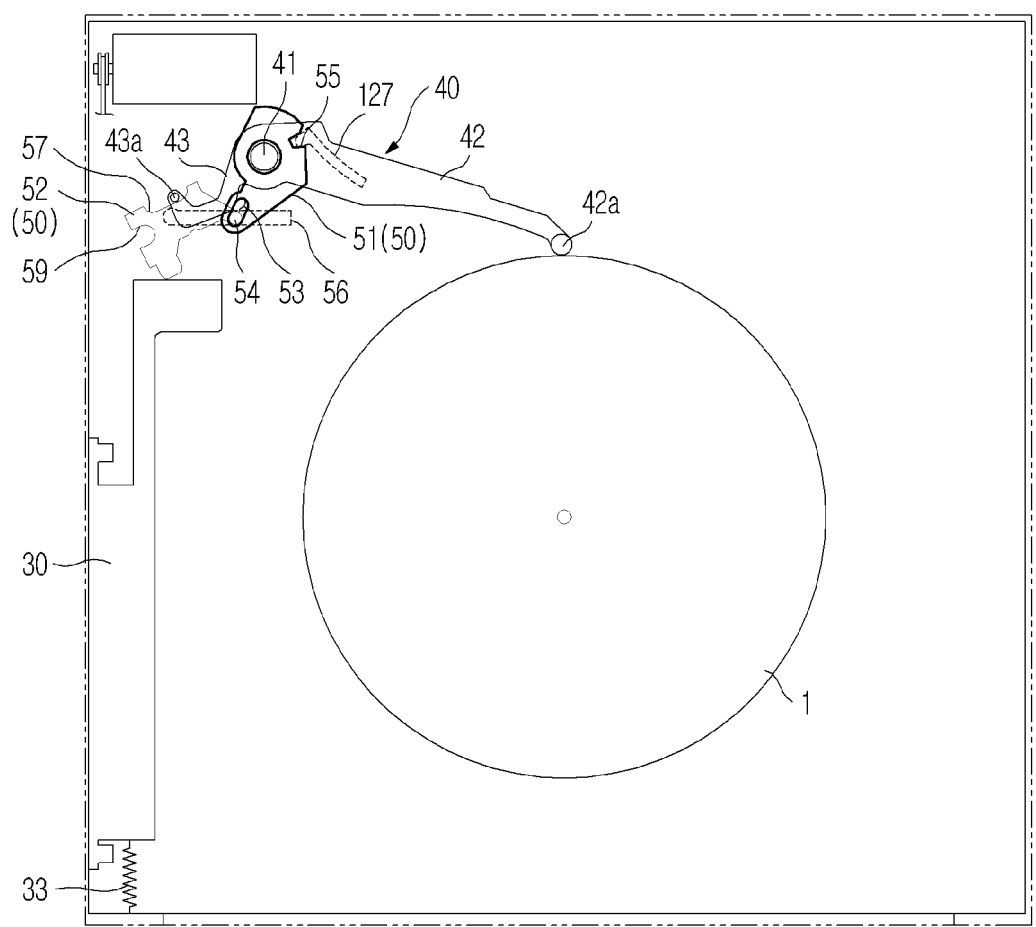
Figure 7:
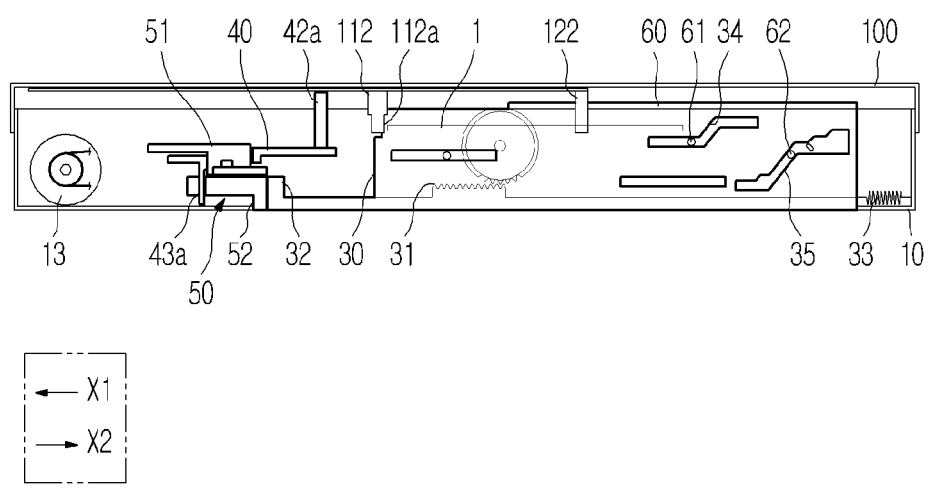
Figure 8:
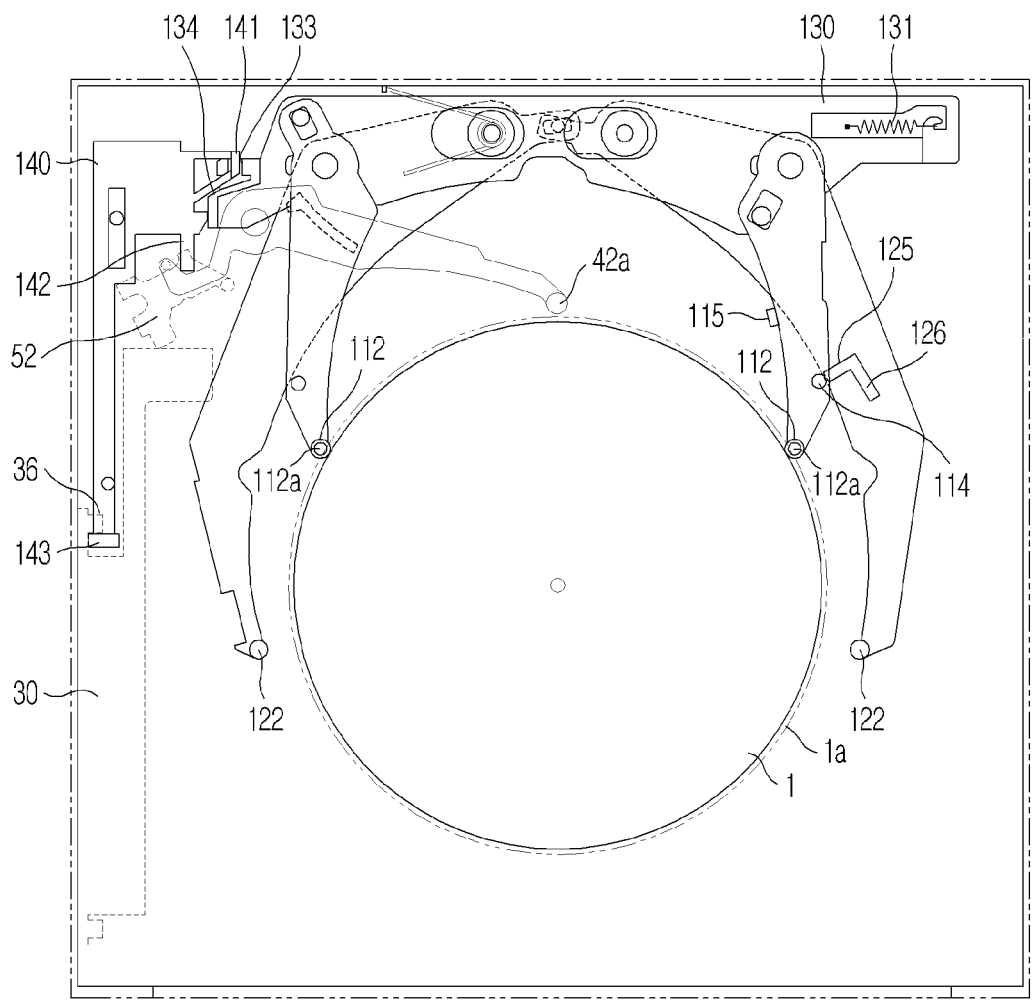
Figure 9:
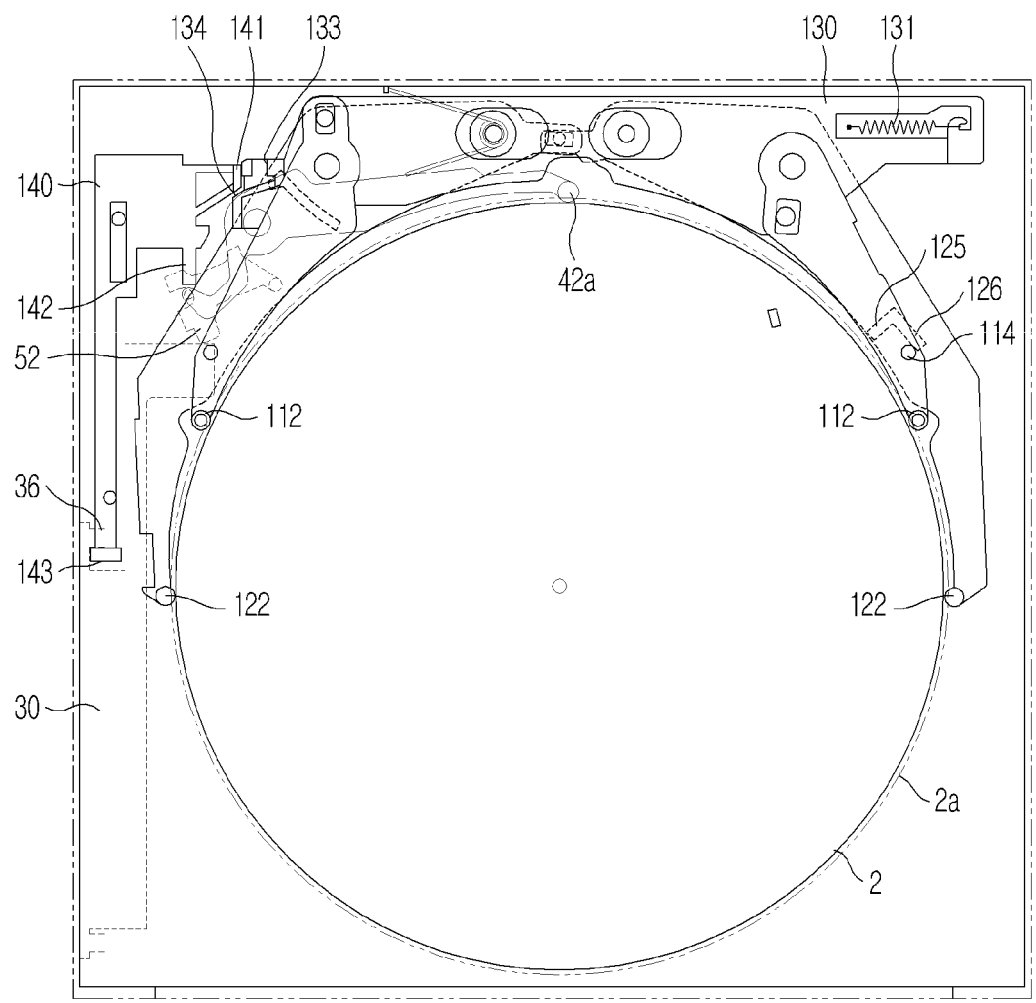
FIGS. 9 to 12 are views illustrating the loading of a second disc according to another exemplary embodiment of the present general inventive concept.
Figure 10:
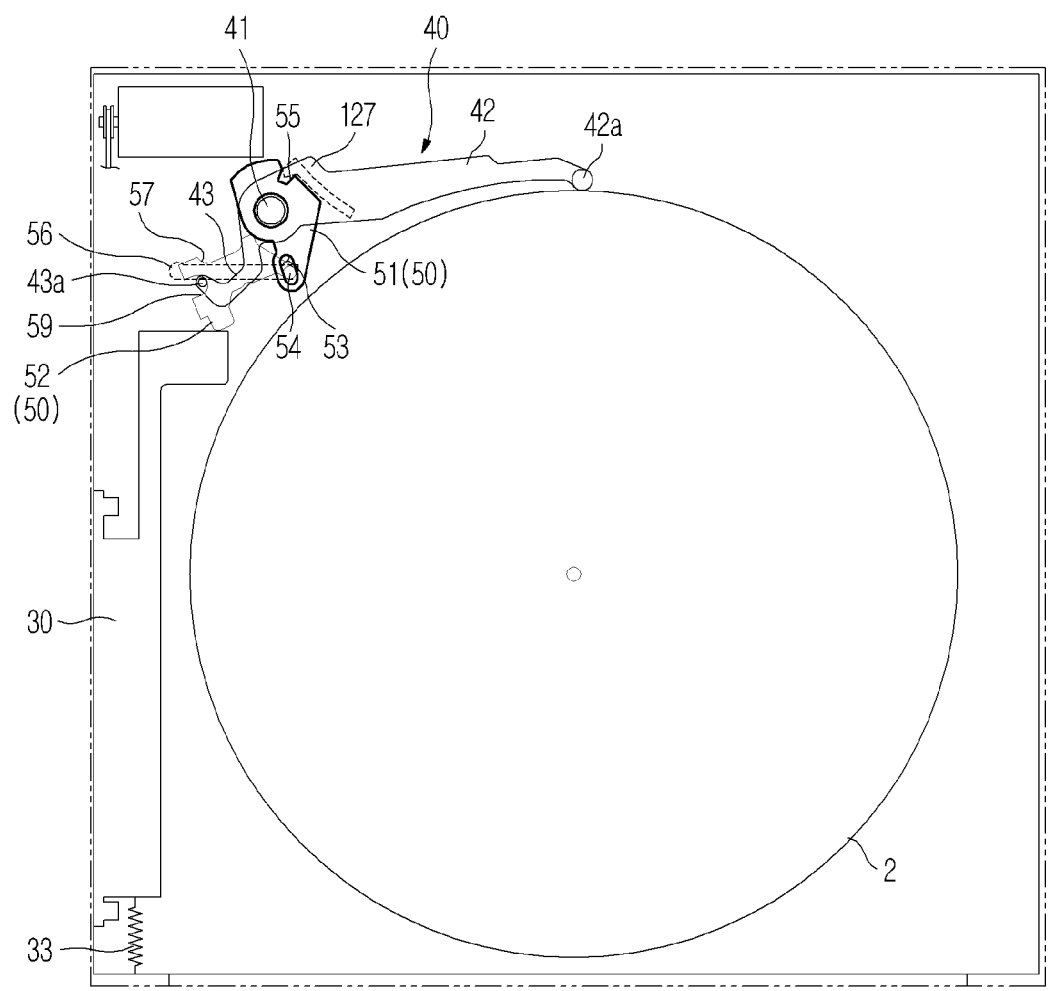
Figure 11:
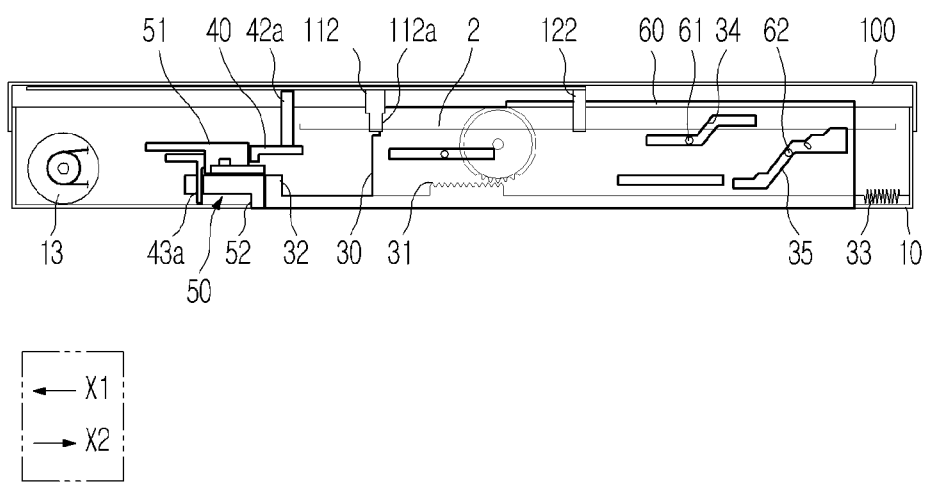
Figure 12:
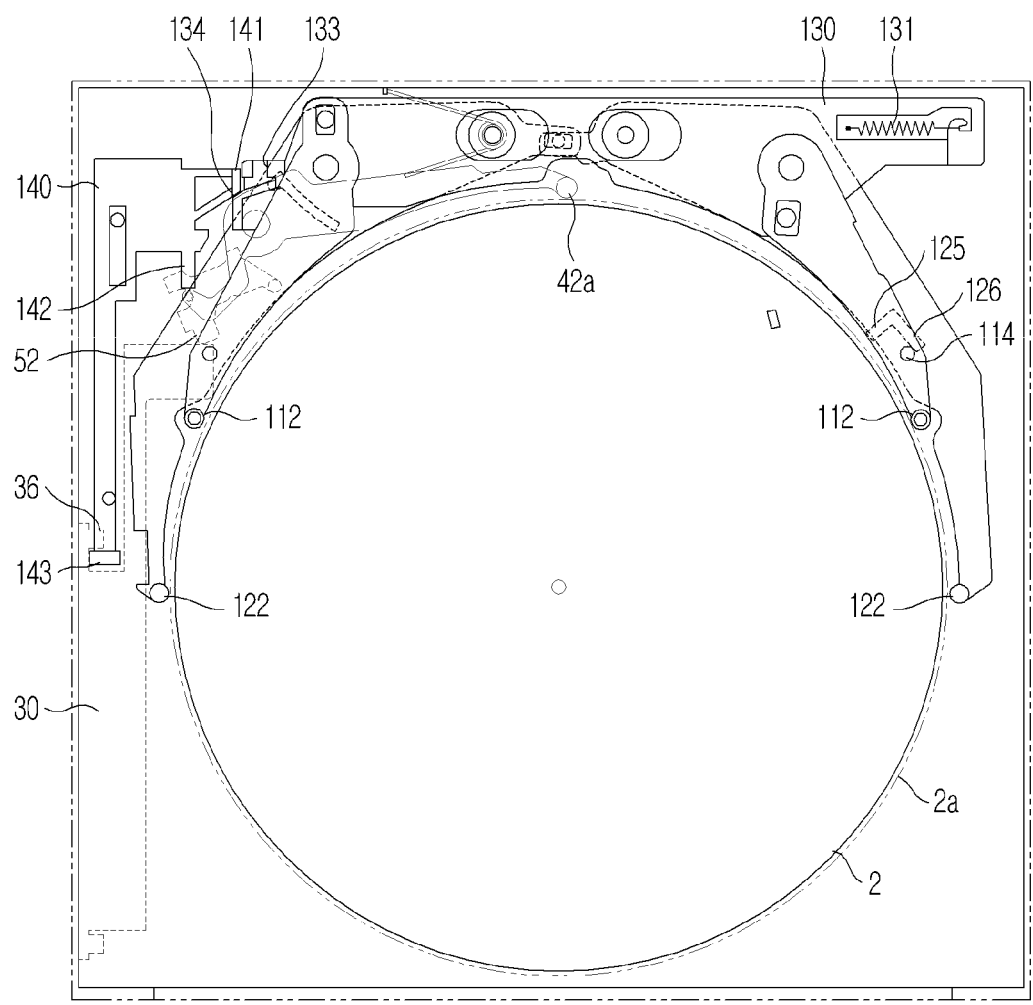

The slider 30 is mounted at the main frame 10 to reciprocate in the X direction. The slider 30 is elastically supported by a third spring 33 in the X1 direction. When the rack 31 of the slider 30 engages with the relay gear 23 of the gear unit 20, the slider 30 moves in the X2 direction. Since the slider 30 is elastically supported by the third spring 33 when no disc is loaded, as illustrated in FIGS. 3 and 4, the rack 31 of the slider 30 does not engage with the relay gear 23 of the gear unit 20. To engage the rack 31 of the slider 30 with the relay gear 23 of the gear unit 20, as illustrated in FIG. 6, it may be necessary to move the slider 30 by a predetermined distance in the X2 direction. Consequently, the slider 30 is operatively connected to the trigger lever 40 and the connecting unit 50 to move the slider 30 by the predetermined distance, which will be described hereinafter in detail with reference to drawings showing the operation of the disc loading device.

FIGS. 5 to 8 are views illustrating the loading of a first disc according to an exemplary embodiment of the present general inventive concept.

As illustrated in FIGS. 5 to 8, when a first disc 1 is loaded, the first disc 1 interferes with the first guide protrusions 112. A counterclockwise rotational force is applied to the right-side first guide lever 110*a*, and a clockwise rotational force is applied to the left-side first guide lever 110*b*. However, the first catching protrusion 114 may be constrained by the second stopper 125, with the result that the right-side first guide lever 110*a* does not rotate in the counterclockwise direction. The left-side first guide lever 110*b* is linked to the right-side first guide lever 110*a*, with the result that the left-side first guide lever 110*b* does not rotate in the clockwise direction. A chucking position of the first disc 1 is decided by the first guide protrusion 112 of the right-side first guide lever 110*a* and the first guide protrusion 112 of the left-side first guide lever 110*b*.

Also, the first disc 1 interferes with the input protrusion 42*a*. The trigger lever 40 rotates in the counterclockwise direction. That is, the input arm 42 and the output arm 43 rotate in the counterclockwise direction. When the output arm 43 rotates in the counterclockwise direction, the output protrusion 43*a* may be constrained by the first constraint part 58 of the connecting rod 52. When the trigger lever 40 continues to rotate in the counterclockwise direction, while the output protrusion 43*a* is constrained by the first constraint part 58, the connecting rod 52 rotates about the third connection protrusion 54. At this time, the slider 30 moves by a distance corresponding to the rotation of the connecting rod 52. With the movement of the slider 30 by the distance corresponding to the rotation of the connecting rod 52, the rack 31 of the slider 30 engages with the relay gear 23 of the gear unit 20, and the slider 30 moves in the X2 direction.

The slider 30 is operatively connected to a chucking unit 60 and the gap adjustment plate 140.

The slider 30 may have a first slit 34 and a second slit 35. The chucking unit 60 may have a first chucking protrusion 61 and a second chucking protrusion 62 inserted in the first slit 34 and the second slit 35, respectively. The first slit 34 and the second slit 35 may have inclines. Consequently, when the slider 30 moves in the X2 direction, the first chucking protrusion 61 and the second chucking protrusion 62 may move downward. As a result, a clamp (not illustrated) of the chucking unit 60 moves downward to chuck the disc. At this time, the first disc 1 moves downward. Since a step 112*a* is formed at the first guide protrusion 112, the first disc 1 is separated from the first guide protrusion 112.

Also, the slider 30 has a third catching protrusion 36, and the gap adjustment plate 140 has a fourth catching protrusion 143 coupled to the third catching protrusion 36. When the slider 30 moves in the X2 direction, the gap adjustment plate 140 also moves in the X2 direction because the third catching protrusion 36 and the fourth catching protrusion 143 are coupled to each other.

The gap adjustment plate 140 is operatively connected to the connection plate 130 and the trigger lever 40.

The gap adjustment plate 140 has a first gap adjustment protrusion 141. The connection plate 130 has a pass-through part 133 through which the first gap adjustment protrusion 141 passes and a contact part 134 to interfere with the first gap adjustment protrusion 141. With the movement of the gap adjustment plate 140 in the X2 direction, the first gap adjustment protrusion 141 passes through the pass-through part 133 but does not interfere with the contact part 134. Consequently, the gap adjustment plate 140 may not be operatively connected to the connection plate 130.

The gap adjustment plate 140 has a second gap adjustment protrusion 142. With the movement of the gap adjustment plate 140 in the X2 direction, the second gap adjustment protrusion 142 is caught by the output arm 43 of the trigger lever 40. That is, the second gap adjustment protrusion 142 pushes the output arm 43 of the trigger lever 40, with the result that the input arm 42 rotates in the counterclockwise direction, and the input protrusion 42*a* may be separated from the first disc 1.

Consequently, the first disc 1 is separated from the first guide protrusions 112 as well as the input protrusion 42*a*, whereby the first disc 1 is in a rotatable state.

Loading of first disc 1 or second disc 2 are detected via a switch or an optical sensor adjacent to the disc insertion hole 11. Further, detecting the size of the inserted disc may be determined via disc interference with second guide levers 120*a* and 120*b*, wherein the second disc 2 may interfere with the second guide levers 120*a* and 120*b* when the second disc 2 is loaded into the disc loading device. On the other hand, the first guide levers 110*a* and 110*b* may interfere with both a first disc 1 as well as a second disc 2 when either first disc 1 or second disc 2 are loaded into the disc loading device.

FIGS. 9 to 12 are views illustrating the loading of a second disc according to another exemplary embodiment of the present general inventive concept.

As illustrated in FIGS. 9 to 12, when a second disc 2 is loaded, the second disc 2 interferes with the second guide protrusions 122 and the first guide protrusions 112.

When the second disc 2 interferes with the second guide protrusions 122, the right-side second guide lever 120*a* rotates in the counterclockwise direction. The left-side second guide lever 120*b*, which is linked to the right-side second guide lever 120*a*, rotates in the clockwise direction. At this time, the first catching protrusion 114 is released from the second stopper 125, and is supported by the second catching protrusion 126. Subsequently, when the second disc 2 continues to be loaded to interfere with the first guide protrusions 112, the right-side first guide lever 110*a* rotates in the counterclockwise direction, and the left-side first guide lever 110*b* rotates in the clockwise direction. Consequently, the first guide protrusions 112 of the first guide levers 110a and 110b and the second guide protrusions 122 of the second guide levers 120a and 120b move out of the second loading region 2a, and a chucking position of the second disc 2 may be decided by the first guide protrusions 112 of the first guide levers 110a and 110b and the second guide protrusions 122 of the second guide levers 120a and 120b.

With the loading of the second disc 2, the left-side second guide lever 120b rotates in the clockwise direction. At this time, the connecting cam 51 rotates in the counterclockwise direction because a fourth connection protrusion 127 of the left-side second guide lever 120b is inserted in a fourth connection groove 55 of the connecting cam 51. With the rotation of the connecting cam 51 in the counterclockwise direction, the connecting rod 52 moves in the Y1 direction.

Also, the second disc interferes with the input protrusion 42a, and the input arm 42 and the output arm 43 rotate in the counterclockwise direction. With the rotation of the output arm 43 in the counterclockwise direction, the output protrusion 43a is constrained by the second constraint part 59 of the connecting rod 52. As the connecting cam 51, operatively connected to the left-side second guide lever 120b, rotates in the counterclockwise direction, as previously described, the connecting rod 52, linked to the connecting cam 51, moves in the Y1 direction, with the result that the output protrusion 43a may not be constrained by the first constraint part 58 but by the second constraint part 59. Idling may be performed until the output protrusion 43a is constrained by the second constraint part 59 while not being constrained by the first constraint part 58. Through this operation, the connecting unit 50 may change the timing at which the rotational force of the trigger lever 40 is transmitted to the slider 30. That is, since time for which the first disc 1 is loaded to the first loading region 1a is different from time for which the second disc 2 is loaded to the second loading region 2a, the connecting unit 50 is operatively connected to the second guide lever 120b to adjust the timing to operate the slider 30 when the loading of the first disc 1 to the first loading region 1a is completed or when the loading of the second disc 2 to the second loading region 2a is completed.

Subsequently, when the trigger lever 40 continues to rotate in the counterclockwise direction, while the output protrusion 43a is constrained by the second constraint part 59, the connecting rod 52 rotates about the third connection protrusion 54, and the slider 30 moves by a distance corresponding to the rotation of the connecting rod 52. With the movement of the slider 30 by the distance corresponding to the rotation of the connecting rod 52, the rack 31 of the slider 30 engages with the relay gear 23 of the gear unit 20, and the slider 30 moves in the X2 direction.

The slider 30 is operatively connected to the chucking unit 60 and the gap adjustment plate 140, in the same manner as in the first disc 1.

That is, the slider 30 may have the first slit 34 and the second slit 35. The chucking unit 60 may have the first chucking protrusion 61 and the second chucking protrusion 62 may be inserted in the first slit 34 and the second slit 35, respectively. The first slit 34 and the second slit 35 may have the inclines. Consequently, when the slider 30 moves in the X2 direction, the first chucking protrusion 61 and the second chucking protrusion 62 move downward. As a result, the clamp (not illustrated) of the chucking unit 60 moves downward to chuck the disc.

Also, the slider 30 has the third catching protrusion 36, and the gap adjustment plate 140 has the fourth catching protrusion 143 coupled to the third catching protrusion 36. When the slider 30 moves in the X2 direction, the gap adjustment plate 140 also moves in the X2 direction because the third catching protrusion 36 and the fourth catching protrusion 143 are coupled to each other.

The gap adjustment plate 140 is operatively connected to the connection plate 130 and the trigger lever 40.

With the loading of the second disc 2, the first guide levers 110a and 110b move out of the second loading region 2a, and the connection plate 130, linked to the first guide levers 110a and 110b, moves in the Y1 direction. Also, the first catching protrusions 114 of the first guide levers 110a and 110b are released from the second stoppers 125 of the second guide levers 120a and 120b to support the second catching protrusions 126 of the second guide levers 120a and 120b.

With the movement of the gap adjustment plate 140 in the X2 direction, the first gap adjustment protrusion 141 interferes with the contact part 134. When the gap adjustment plate 140 continues to move in the X2 direction, the first gap adjustment protrusion 141 pushes the contact part 134, and the connection plate 130 moves in the Y1 direction, because the inclines may be formed at the first gap adjustment protrusion 141 and the contact part 134. With the movement of the connection plate 130 in the Y1 direction, the right-side first guide lever 110a moves in the counterclockwise direction. At the same time, the right-side second guide lever 120a also moves in the counterclockwise direction because the first catching protrusion 114 supports the second catching protrusion 126. In addition, the left-side first guide lever 110b, linked to the right-side first guide lever 110a, moves in the clockwise direction, and the left-side second guide lever 120b, linked to the right-side second guide lever 120a, also moves in the clockwise direction. Consequently, the first guide protrusions 112 of the first guide levers 110a and 110b and the second guide protrusions 122 of the second guide levers 120a and 120b are separated from the second disc 2.

Also, the gap adjustment plate 140 has the second gap adjustment protrusion 142. With the movement of the gap adjustment plate 140 in the X2 direction, the second gap adjustment protrusion 142 pushes the output arm 43 of the trigger lever 40. As a result, the input arm 42 rotates in the counterclockwise direction, and the input protrusion 42a is separated from the second disc 2.

Consequently, the second disc 2 is separated from the first guide protrusions 112 and the second guide protrusions 122 as well as the input protrusion 42a, whereby the second disc 2 is in a rotatable state.

As is apparent from the above description, the disc loading device according to the embodiment of the present general inventive concept may have the effect of considerably reducing thickness, thus being applicable to disc players having a size of about 1 inches or less.

Also, the respective levers have their own single rotary shafts, thereby smoothly achieving the loading/unloading of the disc.

Also, the connecting unit may selectively operate upon loading the first disc or the second disc, and therefore, the operation of the first disc is clearly distinguished from that of the second disc, thereby securing the operational reliability of the disc loading device.

Figure 13:
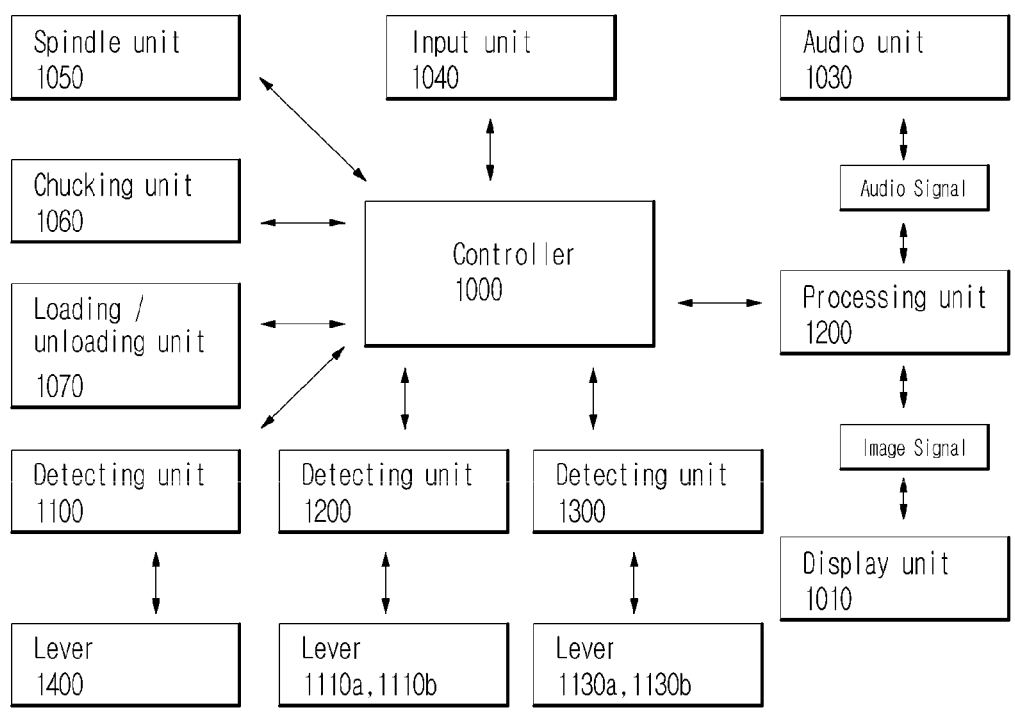
FIG. 13 illustrates a disk drive apparatus including an exemplary embodiment of the present general inventive concept.

FIG. 13 illustrates another embodiment of the present general inventive concept wherein a disk drive apparatus with a controller 1000 controls disc loading and unloading into the apparatus. A disc loading and unloading unit 1070 advances small and large discs toward a loading region and a chucking unit 1060 chucks discs in the loading region. Further, detecting units 1100, 1200, and 1300 are mounted to sense whether a disc has been placed within the apparatus. Also, a trigger lever 1400 is rotatably mounted outside the loading region while first levers 1110a, 1110b and second levers 1120a, 1120b are also mounted outside the loading region to assist loading of discs into the loading region. Additionally, the controller 1000 may receive user input from an input unit 1040, wherein the input unit may receive commands of disc eject, disc play, disc forward, disc reverse, disc pause, and disc stop. Furthermore, a processing unit 1020 controlled by the controller 1000 may process audio and image signals emitted by an audio unit 1030 and display unit 1010, respectively.

Although a few embodiments of the present general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. A disc loading device, comprising:
    a main frame and a sub frame defining a loading region to allow a first disc and a second disc having different diameters to be loaded thereto;
    a first guide lever rotatably mounted outside the loading region on the sub frame and extending into the loading region to interfere with the first disc or second disc when the first disc or second disc is loaded into the disc loading device;
    a second guide lever rotatably mounted outside the loading region on the sub frame and extending into the loading region to interfere with the second disc when the second disc is loaded into the disc loading device;
    a trigger lever rotatably mounted outside the loading region on the main frame and extending into the loading region to interfere with the discs;
    a chucking unit to chuck the first disc or the second disc located at the loading region;
    a slider reciprocatably mounted outside the loading region to operate the chucking unit; and
    a connecting unit disposed between the trigger lever and the slider to transmit a rotational force of the trigger lever to the slider,
    wherein the connecting unit is selectively operatively connected to the second guide lever, upon loading the first disc or the second disc, to change a timing at which the rotational force of the trigger lever is transmitted to the slider.

2. The disc loading device according to claim 1, wherein the connecting unit comprises a connecting cam rotatably mounted to be operatively connected to the second guide lever and a connecting rod translatably and rotatably mounted to be operatively connected to the connecting cam and the trigger lever.

3. The disc loading device according to claim 2, wherein the connecting cam has a third connection groove to be operatively connected to the connecting rod, and the connecting rod has a third connection protrusion inserted in the third connection groove.

4. The disc loading device according to claim 2, wherein the connecting cam has a fourth connection groove to be operatively connected to the second guide lever, and the second guide lever has a fourth connection protrusion inserted in the fourth connection groove.

5. The disc loading device according to claim 2, wherein the connecting rod has a first constraint part and a second constraint part to be operatively connected to the trigger lever, and the trigger lever has an output protrusion to be selectively constrained by the first constraint part and the second constraint part.

6. The disc loading device according to claim 5, wherein the output protrusion is constrained by the first constraint part when the connecting cam is not operatively connected to the second guide lever, and the output protrusion is constrained by the second constraint part when the connecting cam is operatively connected to the second guide lever.

7. The disc loading device according to claim 2, wherein the connecting rod has an auxiliary protrusion member to provide an elastic force to rotate the connecting rod in one direction.

8. The disc loading device according to claim 1, further comprising:
    a gap adjustment plate to be operatively connected to the slider with a movement of the slider.

9. The disc loading device according to claim 8, wherein the slider has a third catching protrusion to be operatively connected to the gap adjustment plate, and the gap adjustment plate has a fourth catching protrusion to be coupled to the third catching protrusion.

10. The disc loading device according to claim 8, wherein the gap adjustment plate has a second gap adjustment protrusion to push the trigger lever.

11. The disc loading device according to claim 8, further comprising:
    a connection plate selectively operatively connected to the gap adjustment plate to cause rotations of the first guide lever and the second guide lever to separate the first guide lever and the second guide lever from the second disc.

12. The disc loading device according to claim 11, wherein the gap adjustment plate has a first gap adjustment protrusion, and the connection plate has a pass-through part to allow the first gap adjustment protrusion to pass therethrough when loading the first disc and a contact part to interfere with the first gap adjustment protrusion when loading the second disc.

13. The disc loading device according to claim 12, wherein the connection plate is operatively connected to the first guide lever, and the second guide lever is operatively connected to the first guide lever.

14. The disc loading device according to claim 13, wherein the connection plate has a first connection protrusion to be operatively connected to the first guide lever, and the first guide lever has a first connection groove to receive the first connection protrusion.

15. The disc loading device according to claim 13, wherein the first guide lever has a first catching protrusion to be operatively connected to the second guide lever, and the second guide lever has a second catching protrusion supported by the first catching protrusion.

* * * * *